Figure 1:
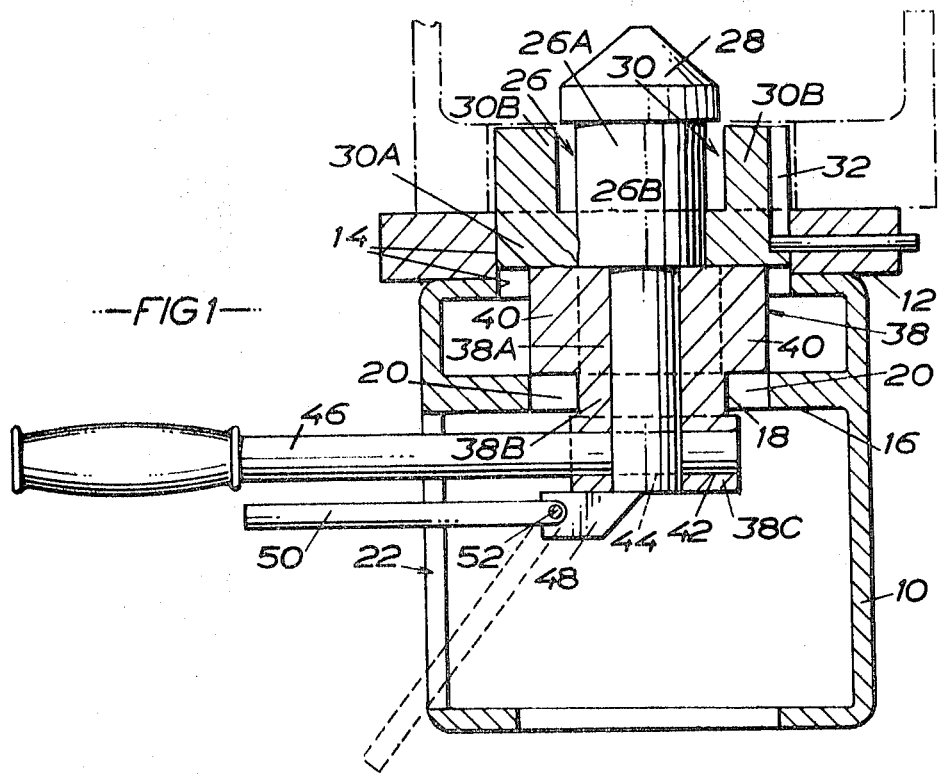

United States Patent

[11] 3,612,466

| [72] | Inventor | Arthur James Arnold<br>Doncaster, England |
|------|----------|-------------------------------------------|
| [21] | Appl. No. | 854,221 |
| [22] | Filed | Aug. 29, 1969 |
| [45] | Patented | Oct. 12, 1971 |
| [73] | Assignee | Container Twistlocks Limited<br>Doncaster, England |

[54] RETRACTABLE LOCKING DEVICE
2 Claims, 3 Drawing Figs.

[52] U.S. Cl. .................................................. 248/361 R,
105/366 B, 296/35 A
[51] Int. Cl. .................................................. B65j 1/22
[50] Field of Search .......................................... 296/35 A;
248/361; 105/366 B

[56] References Cited
UNITED STATES PATENTS

| 3,331,333 | 7/1967 | Coulson | 248/361 X |
| 3,486,787 | 12/1969 | Campbell | 296/35.1 |
| 3,521,845 | 7/1970 | Sweda et al. | 105/366 B |

*Primary Examiner*—Benjamin Hersh
*Assistant Examiner*—John A. Pekar
*Attorney*—Abraham A. Saffitz

ABSTRACT: A locking device for a vehicle platform comprising a locking member with a horizontal lug adapted to engage in a slot in a container on the platform in a first position and which can be released from locking engagement by twisting the locking member and then lowering the same to a second position.

INVENTOR:
A. J. ARNOLD

RETRACTABLE LOCKING DEVICE

The invention relates to freight containers, and particularly to a locking device for securing same to a road or rail vehicle.

Where containers of different sizes are to be transported by a road or rail vehicle, the vehicle requires to be fitted with locking devices in different positions to accommodate the different containers. When one size of container is being handled the locking devices for another size of container have to be removed or retracted to provide a flush surface to allow the one size of container to sit over the locking points for the other size of container. A disadvantage of removable parts is that a receptacle of some kind must be provided to stow the parts, which might otherwise be lost, and previously proposed retractable locking devices, while not suffering from this drawback, have incorporated springs and have been generally inconvenient to use.

It is an object of the present invention to provide a locking device which obviates or mitigates these disadvantages.

According to the present invention there is provided in or for a road or rail vehicle, one or more locking devices for securing a freight container to the road or rail vehicle, the or each such device comprising a locking member which is movable through a guide along an axis between first and second axial positions and is rotatable about said axis between first and second rotary positions, said guide being connected to, or for connection to, the road or rail vehicle such that in the second axial position the locking member lies under surface of the road or rail vehicle on which the freight container is supported, whereas in the first position it extends above said surface and can be twisted about said axis so that it engages over a fitting on the container and thereby locks the container to the vehicle.

Preferably, the locking member is adapted to be engaged or is provided with a handle by which the locking member may be moved between the first and second axial positions and the first and second rotary positions.

The guide preferably includes a plate having an aperture through which the locking member extends.

Figure 3:
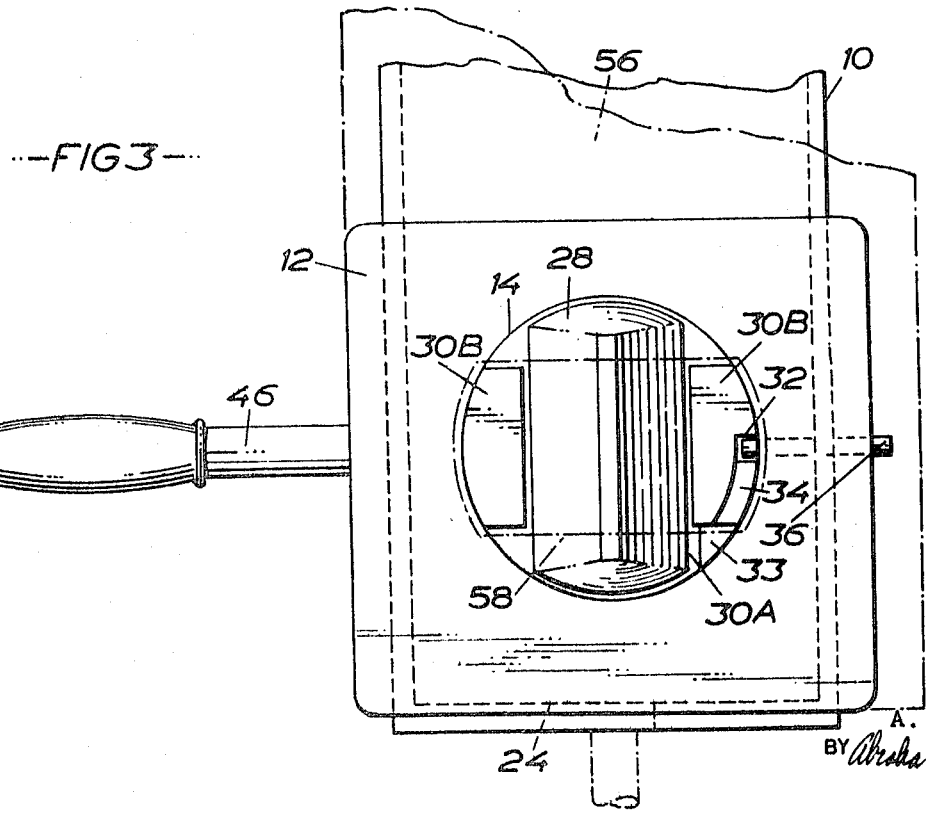
Figure 2:
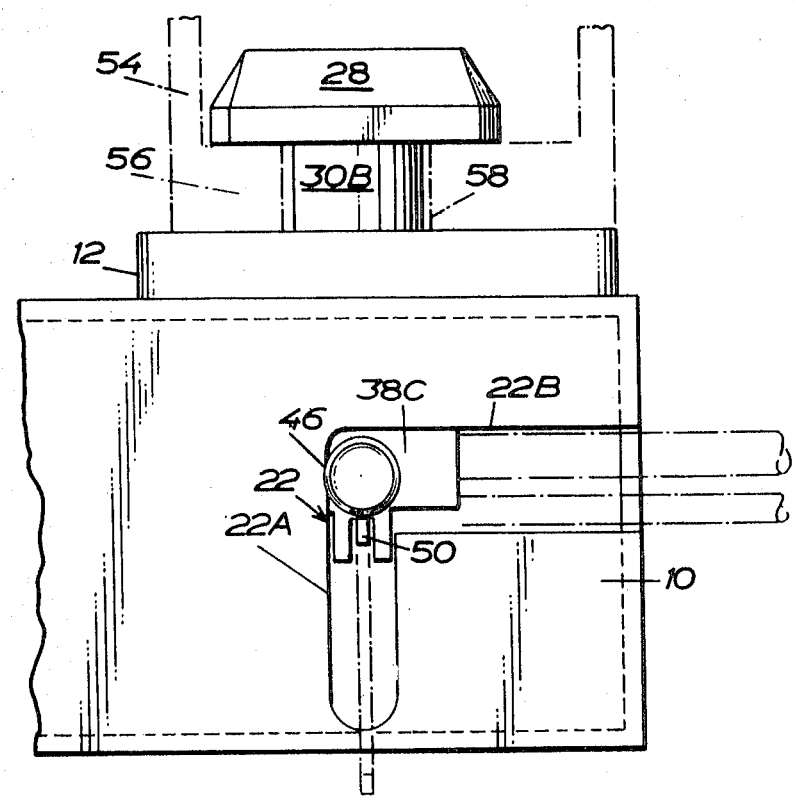

An embodiment of the invention will now be described, by way of example only, with reference to the accompanying drawings, wherein:

FIG. 1 is a sectional side view of a locking device according to the invention which is connected to a road or rail vehicle having a platform for supporting the freight container; and FIGS. 2 and 3 are respectively an end view and plan of the arrangement shown in FIG. 1.

In the drawings, there is shown a box girder 10 which is part of a road or rail vehicle and has a plate 12 welded to the top thereof, such plate 12 and girder 10 each having a circular aperture 14 therein.

Within the girder 10 is a guide plate 16 which has an aperture 18 therein which is circular but has diametrically opposite keyways 20. The side of girder arm 22A and a horizontal arm 22B (FIG. 2) which extends into a horizontal slot 24 in the end of girder 10.

The device includes a locking member in the form of a spindle 26 having a large diameter upper portion 26A and a lower small diameter portion 26B, and there is a cross piece 28 on the top end of the spindle 26, which cross piece 28 extends beyond the large diameter portion 26.

Surrounding the upper portion 26B is a guide collar 30 which is a plate 30A and diametrically opposed upstanding arms 30B which are of a breadth the same as that of the cross piece 28.

On one of the arms 30B on the outer surface thereof, there is an axial slot 32 and a circumferential groove 34 extending from the top of slot 32 to the edge of arm 30B. Extending into slot 32 is a dowel pin 36 which is located in a bore in plate 12. Dowel pin 36 prevents the collar 30 from rotating in plate 12. There is a radial notch 33 in plate 30A so that the collar 30 can be removed from plate 12 by lowering same to cause the end of dowel pin 36 to reach the top end of slot 32, rotating the collar 30 so that the pin 36 passes along slot 34 and raising the collar 30 out of plate 12 so that the pin 36 passes through notch 33.

Surrounding the lower portion 26B of spindle 26 is a composite spindle collar 38 which is made up of three circular sections 38A, 38B and 38C, the section 38A having diametrically opposite axial keys 40 so that the outer shape of section 38A is the same as that of aperture 18.

The section 38C has a radial bore 42 therethrough which registers with a radial through bore 44 in the portion 26B in spindle 26 and detachably engaged in bores 42 and 44 is a handle 46.

To the lower end of the section 38C, are attached a pair of lugs 48 on which is pivotally mounted a locking lever 50 by means of a pin 52.

The locking device illustrated is for cooperation with a corner casting or fitting, which is indicated in chain dotted lines at 54, of a freight container so that the cross piece can engage over the fitting 54 to lock the fitting 54 and hence the container to the vehicle. The fitting 54 has a plate 56 which engages plate 12 by resting on same and in the plate is a hole 58, shown in FIG. 3, which is of the same peripheral shape as the plan shape of cross piece 28.

The operation of the device illustrated is as follows. In the position shown in the drawings the device is in position locking the container to the vehicle platform in that the cross piece 28 is above plate 56 of the fitting and engages over such plate 56. To release the device, the spindle 26 is twisted about its axis by 90° by means of handle 46. In this step handle 46, and also lever 50 are moved along arm 22B of slot 22 and slot 24 to the position shown in chain dotted lines in FIGS. 2 and 3. Cross piece 28 is now above the arms 30B of collar 30 and in alignment with hole 58 in fitting 54 so that the fitting (i.e. container) can be released from the device or vehicle platform. As the spindle 26 is so twisted the collar 38 is also rotated through 90° so that keys 40 on section 38A become displaced angularly relative to the keyways 20 so that the spindle 26 and collar 28 can no longer drop axially of the spindle. Thus, the spindle 26 is rotatable by handle 46 between a first rotary position in which the fitting 54 is locked to the vehicle and a second rotary position in which the fitting can be removed from the locking device.

When the device is in the first rotary position, the handle 50 can be pivoted downwards as indicated in dotted lines in FIG. 1, so that handle 50 lies in arm 22A of slot 22 to prevent the spindle 26 from moving to the second rotary position inadvertently.

The spindle 26 can also be moved axially thereof so that the cross piece 28 can be lowered below the surface of plate 12 when the device is not in use and must be out of the way to allow a container of a different size to be mounted on the road or rail vehicle. To effect this, the fitting 54 is removed when the spindle 26 is in the second rotary position and is not replaced before the spindle 26 is moved back to the first rotary position. In this position, the keys 40 are in alignment with keyways 20 so that the collar 38, spindle 26 and collar 30 can be moved down by handle 46, which passes along arm 22A until the cross piece 28 lies under plate 12 and the device will not be in the way if it is not to be used.

Therefore, the spindle is also movable axially between a first axial position in which cross piece 28 can engage the fitting 54 and a second axial position in which it lies under plate 12.

The device described is located on the vehicle so that the handle 46 can be easily operated by a person standing on the ground. Moreover, the device is simple and inexpensive in construction. Also, the position of the handle gives a clear indication as to whether or not the device is locked.

Modifications of the invention may be made without departing from the scope of the invention. Thus, the device may be entirely detachable from the vehicle instead of plate 16 being integral with girder 10.

In practice, the road or rail vehicle is provided with several of the above described locking devices at appropriate places to enable different sized containers to be connected firmly by means of selected ones of the devices to the vehicle, and the devices not in use can be positioned to the second axial position as above described.

The devices may be located at suitable locations, for example below the floor as above, or where the vehicle has no floor, on the chassis.

I claim:

1. In a road or rail vehicle, one or more locking devices for securing a freight container to the vehicle, each locking device comprising:

guide means connected to the vehicle defining a first axial position and a second axial position;

a locking member which is movable through said guide means along the axis between the first and the second axial positions and which is rotatable about said axis between a first and a second rotary position;

a means for connecting said guide means to the vehicle which is arranged so that, in the second axial position, the locking member lies under the surface of the vehicle on which the freight container is supported, whereby in the first position said locking member extends above said surface and can be twisted about said axis from the first to the second rotary position so that it engages over a fitting on the container and thereby locks the container to the vehicle;

a handle connected to the locking member for the purpose of moving the locking member between the first and second axial and rotary positions;

a casing surrounding the locking member, said casing having a slot with a portion extending parallel to said axis and a portion extending circumferentially of said axis;

and a locking lever pivotally connected to the locking member, said locking member being pivotally movable into the portion of the slot extending parallel to said axis to prevent the locking member from moving unnoticed from the second rotary position.

2. In a road or rail vehicle, one or more locking devices for securing a freight container to the vehicle, each locking device comprising:

guide means connected to the vehicle defining a first axial position and a second axial position;

a locking member which is movable through said guide means along the axis between the first and the second axial positions and which is rotatable about said axis between a first and a second rotary position;

a means for connecting said guide means to the vehicle which is arranged so that, in the second axial position, the locking member lies under the surface of the vehicle on which the freight container is supported, whereby in the first position said locking member extends above said surface and can be twisted about the axis from the first to the second rotary position so that it engages over a fitting on the container and thereby locks the container to the vehicle;

said guide means including a plate with an aperture therein through which the locking member extends, means defining keyway slots opening to said aperture, a collar with keys on said locking member so that the locking member can be moved between the first and second axial positions when the collar and aperture are in a particular angular relationship;

said locking member comprising a spindle with its axis along said axis and a cross piece at one end thereof which is for engaging over a fitting on a container; and said guide means further including a guide collar surrounding said locking spindle which collar is movable axially but not rotationally of said axis and is made up of a plate with upstanding diametrically opposite arms of a width equal to the width of the cross piece so that in the first rotary position the cross piece lies over the arms so that the cross piece and arms can extend into an appropriately shaped aperture in the fitting and in the second rotary position the cross piece in axial direction lies between the arms.